Sept. 18, 1951     J. R. HANSEN     2,567,936

DIVIDING HEAD

Filed June 8, 1948     2 Sheets-Sheet 1

INVENTOR
JAMES R. HANSEN
BY *Gustav Drews*
his ATTORNEY

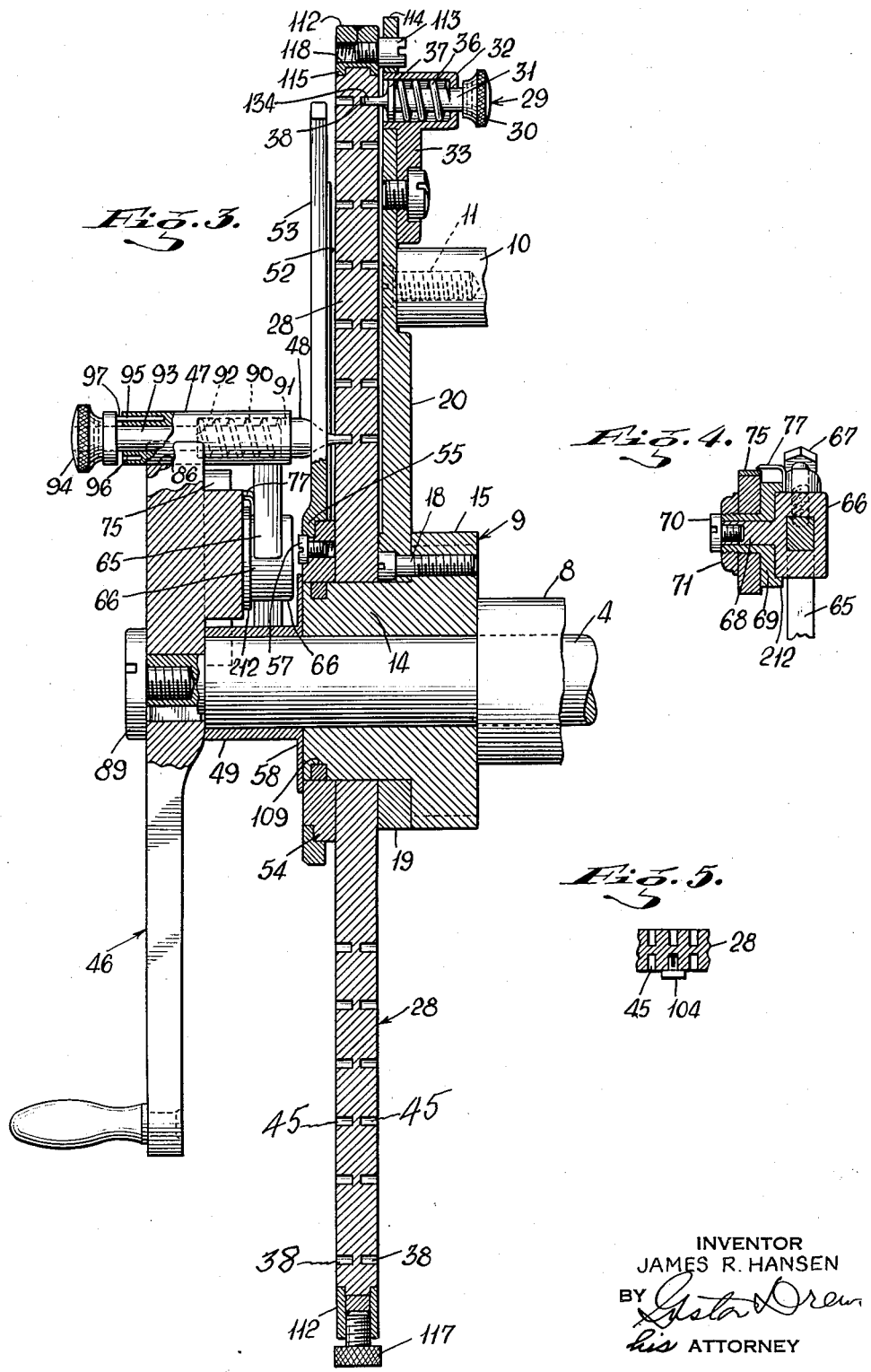

Patented Sept. 18, 1951

2,567,936

UNITED STATES PATENT OFFICE 2,567,936

DIVIDING HEAD

James R. Hansen, Bremerton, Wash., assignor of one-half to Gustav Drews, Garden City, N. Y.

Application June 8, 1948, Serial No. 31,709

5 Claims. (Cl. 90—57)

This invention relates in general to dividing heads for machine shop tools, such as milling machines, spiral milling machines, drill presses, and the like.

Among the objects of the present invention it is aimed to provide an improved dividing head for machine shop tools, such as milling machines, spiral milling machines, drill presses, and the like requiring no differential gears or the like, such as disclosed in my Patent No. 2,357,329, issued September 5, 1944.

It is still another object of the present invention to provide an improved dividing head characterized by having the indexing holes on the faces thereof arranged in a spiral instead of in a circle and by having a pin receiving device for cooperating with such spiral indexing holes.

It is still another object of the present invention to provide an improved dividing head characterized by having a reversible control disk provided with a specially generated spiral row of indexing holes on both sides thereof constituting one of the main parts of the present invention and a circular row of indexing holes on both sides of the disk. According to well known practice, the circle of holes on either side of the disk may be used with a standard machine shop tool, such as a milling machine, drill press, or the like, to control the cutting operations.

It is still another object of this invention to provide a scale along which adjustment of index pin arc radius is made, for the purpose of controlling in a direct geometric way the magnitude of the differential motion, said scale being calibrated in the same angular units as control disk. By controlling differential advance or recession of index pin in scale engraved units of angular hole equivalents of control disk, a direct scale setting can be made to the exact number of holes, plus or minus, required to make a division job come out even.

These and other features, capabilities and advantages of the present invention will appear from the subjoined detail description of one specific embodiment thereof illustrated in the accompanying drawings in which Fig. 1 is an end elevation of the dividing head operatively associated with a work table.

Fig. 3 is a side elevation partly in section on the line 3—3 of Fig. 2 of the dividing head drawn to a scale larger than that shown in Fig. 2.

Fig. 4 is a section on the line 4—4 of Fig. 2.

Fig. 5 is a section on the line 5—5 of Fig. 2.

Figure 2:
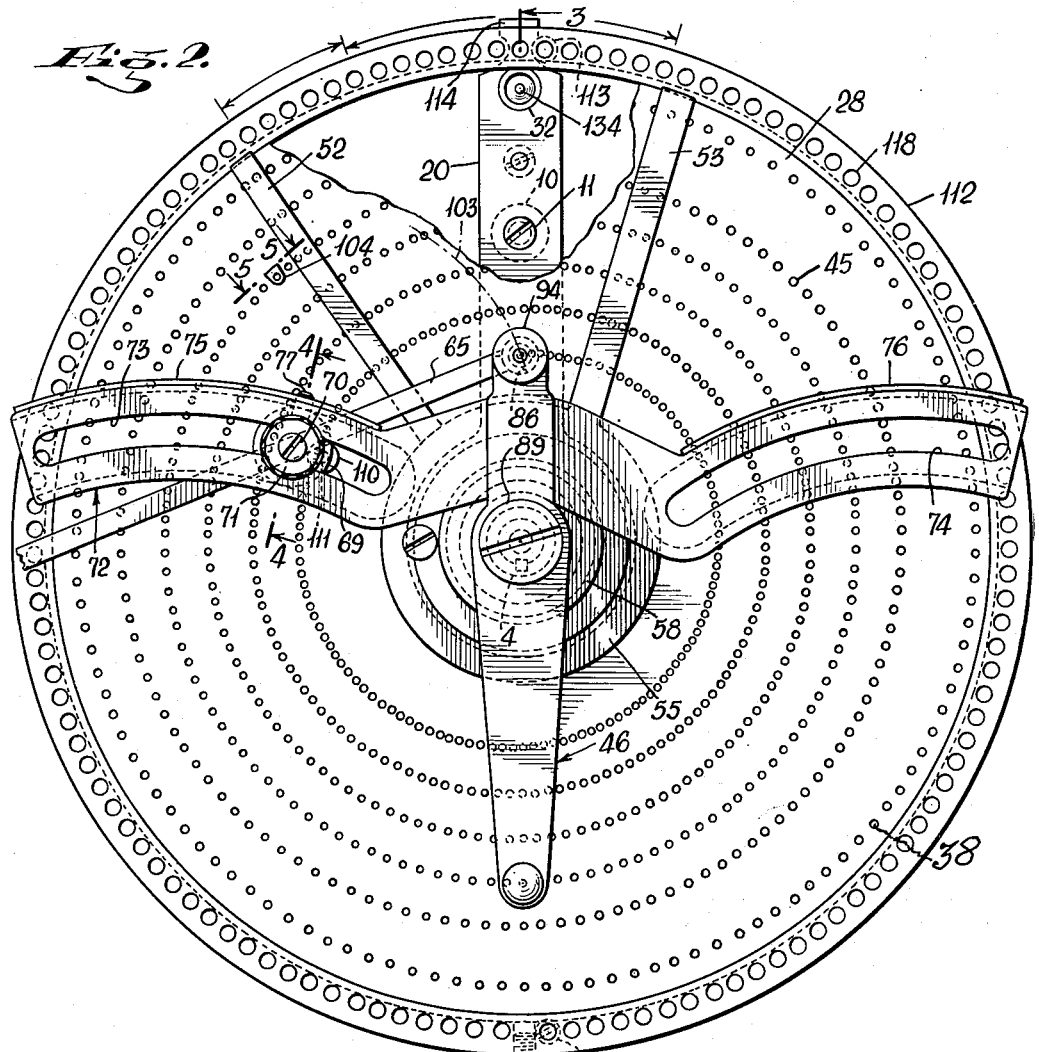
Fig. 2 is a front elevation of the dividing head showing one face of the control disk drawn to a larger scale than that shown in Fig. 1.

In the embodiment shown, the shaft 1 is illustrated as journalled in a housing 2 with a work support, here shown as a work receiving table 3 secured to the upper end thereof. It is, of course, obvious that the shaft 1 is merely illustrative of the main shaft of a machine shop tool, whether rotatable about a vertical axis, a horizontal axis, or an inclined axis of any machine shop tool, such as a milling machine, drill press, or the like.

The shaft 1 is operatively associated with the shaft 4 of the dividing head 5. The operative connection between the shaft 1 and shaft 4 in the present instance is shown as including a worm 6 on the shaft 4 in mesh with a worm wheel 7 on the shaft 1. While not limited to a reduction of 40 to 1, since the rotation of the driving shaft 1 generally is 1 to 40 rotations of the driving shaft 4 in the standard machine shop tool, it will be assumed that the reduction here too is illustrative of the standard 40 to 1 ratio.

The shaft 4, in the present instance, is journalled in the bearing 8 extending from the housing 2 and the shaft 4 extends through and beyond the bearing 8 to receive the gear sleeve 9 in which the shaft 4 is freely rotatable. The gear sleeve 9 is typical of the floating sleeve provided in nearly all heads for spiral milling. When a spiral milling operation is performed, the sleeve 9 with its associated parts is, according to standard practice, operatively connected to rotate with the horizontal table screw of the milling machine. When a dividing or indexing operation only is performed, the sleeve 9 is fixed to some sationary part of the frame or housing 2 such as the extension 10, the extension 10 in the present instance being connected by the screw 11 to the arm 20 which has an enlargement 19 provided with an opening to receive the diminished portion 14 of the sleeve 9, which enlargement 19 in turn is secured or anchored to the shoulder portion 15 of the sleeve 9 by the screws 18. The arm 20 is connected to the dividing guide, here shown as a plate or disk 28 by the spring pressed pin 29. The spring pressed pin 29 is provided with a head 30 having a stem 31 slidably mounted in the housing 32 at the end of the bracket 33 mounted on the arm 20. The pin 29 has a stud 134 formed to engage one of the recesses or holes 38 in the rear face of the disk 28. This pin 29 is in turn provided with a spring 36 tensioned between the shoulder 37 and the inner end of the housing 32, yieldable to urge the stud 134 outward. The bracket 33 is mounted on the arm 20 so that the stud 134 may enter and register with one of the holes 38.

The dividing plate 28 is provided with a concentric circular row of holes 38 on each face of the disk or plate. This disk is also provided with a spiral row of holes 45 on each face. This disk 28, as clearly shown in Fig. 3, is rotatably mounted on the diminished portion 14 of the sleeve 9.

In the present instance, each spiral, convolute or helical row of holes 45 consists of five complete 360° turns. The holes of the five turns are in turn in alinement with one another radially of the disk 28 and also in alinement with the holes of the row 38. Consequently, each 360° turn of a spiral row 45 has 126 holes or recesses.

Since, in a dividing or indexing operation, the shaft 4 is to be successively turned relative to the disk 28, in the present arrangement the shaft 4 has fixed thereto the crank 46 which has operatively connected thereto the pin housing 47 containing the stud or pin 48 for cooperation with one of the holes in the spiral row 45.

For securing the plate 28 in position on the diminished portion 14 of the sleeve 9 against the enlarged portion of arm 29, there is provided a collar 49 which slips on shaft 4 and has a shoulder 58 extending radially to the shaft 4 and engaging the outer or front face of the enlargement 54. The adjustable angle arms 52 and 53 are rotatably mounted relative to the sleeve 49. In the present instance, the arm 52 has the enlargement 54 rotatably mounted on the diminished portion 14 of sleeve 9 and the arm 53 is provided with the enlargement 55 rotatably mounted on the enlargement 54. The ring 109, Fig. 3, is a piston ring type expanding friction means provided to hold sector arms 52 and 53 in position. The enlargement 55 is connected by the set screw 57 to the enlargement 54, and the collar 49 has a flange 58 engaging the outer face of the enlargement 54, so that the flange 58 in this way anchors both arms 52 and 53 on the diminished portion 14 of the sleeve 9.

The sector arms 52 and 53 are set at the angle necessary to span the required number of index holes and then secured in this position relative to each other by tightening screw 57 which is conventional practice.

The pin housing 47, in the present instance, instead of being secured to an integral part of the crank arm 46, is mounted at the end of an arm 65 which is slidably adjustable in the enlargement 66. The position of the arm 65 in the enlargement 66 may be secured in position by the set screw 67, Fig. 4. The enlargement 66 in turn has an extension 68 extending through the slide block 69, and connected to the slide block 69 by the screw 70. The slide block in turn is provided with a nut 71 to anchor the slide block 69 in position on the slide 72 which is fixed to the crank 46, as an instance by being integral with the crank 46 as shown. The slide 72, see Fig. 2, has two slots 73 and 74, the slide block 69 being slidably mounted in the slot 73 in the present setup. One side of the slide 72 is provided with positioning scales 75 and 76. The position of the slide block 69 relative to the scales 75 and 76 will be determined by the pointer 77, see Fig. 4, secured to the slide block 69. The degree of freedom of rotation of the enlargement 66 relative to the slide block 9 will be determined by the set screw 70. The block 69 and indicator 77 are prevented from turning by the slide stud 110, the diminished portion of which 111, Fig. 2, serves as a rivet to secure it to the flange enlargement 212, Fig. 3, of the slide block 69. It is slightly shorter than the thickness of the slide 72 to provide clearance for the nut 71.

It is possible to either gain or lose differentially any number of holes from 20 to 80 over the whole operation.

The curvature of the slides 73 and 74 is plotted or determined as follows: The center of extension 68 constituting the center of the arc 103 is located at the end of the slide, nearest the crank, to lose the greatest number of holes because in this position the index pin swings away from the true center line 3—3 of the crank at the sharpest angle. When the slide block 69 is secured at the other or outer end of the slide 73, the radius of the arc 103 is longer, and the angular departure of the index pin from the center line 3—3 is less abrupt and only a half hole per turn of spiral is lost, or twenty holes during all forty turns. All the intermediate pivot points from 20 to 80 lie along the curved slides 73 and 74 as shown and are indicated by the pointer 77 on the scale 75.

The crank 46 is preferably secured in place on the front end of the shaft 4 by the screw 89.

When it is desired to reverse the disk 28, it is of course only necessary to remove the screw 89 thereby to remove the crank 47 and associated parts, and also the collar 49 which anchors the angle arms 52 and 53 in position to cooperate with the front face of the disk 28. Thereupon after the disk 28 has been reversed and replaced on the sleeve 14, it is only necessary again to position the angle arm assembly 52 and 53, replace the crank 46 and associated parts on the front end of the shaft 4 and replace the screw 89. The pin housing 47, see Fig. 3, is provided with a spring 90 for normally urging the pin portion 48 outward, such spring 90 being positioned between the shoulder 91 of the pin 48 and the shoulder 92 of the housing 47. The pin 48 is provided with a shank 93 extending to and beyond the front end of the housing 47, there to receive the control head 94. The housing 47 is also provided with two recesses, a long recess 95 and a short recess 96 to cooperate with the pin 97. When the pin 97 is positioned in the recess 95 as shown, the pin 48 is in extended position to enter an opening in the disk 28, whereas when the pin 97 is positioned in the recess 96, then the pin 48 just clears the disk 28.

Several disks having different arrangements of holes may be provided without departing from the general spirit of the invention. As an instance, there may be provided a disk having one specially generated spiral row of holes on one face with certain lead characteristics and a certain number of holes per turn and another specially generated spiral row on the other face with substantially the same characteristics but having a different number of holes per turn. A circle cooperates with the spiral to produce fractional allowances. When the required allowances are even multiples of the ratio of gear reduction to some number of available complete turns of spiral, the circle and the annulus are not used (within certain limits of range capacity) because division is natural, factoral, automatic. When a number of disks having only one spiral and one circle on each side are used, these circles and spirals should be the same distance from the center on all of the plates or disks. This construction would register with fixed position of rest or support 86 radially, also with pin 134. It has been calculated, as an instance, that two plates, with four spirals (a total of about 4000 holes) will do all numbers from 2 to 454 except four, viz, 353, 359, 378 and 419. By using another plunger pin and single circle of holes (not shown) compounded to main plate, as is often done conventionally, all numbers up to 6000 may be done accurately without changing or turning either plate.

The idea of the spiral arrangement, namely, the use of the spiral rows of holes, is to make it possible to lose or gain a given number of holes in a given number of degrees of revolution of the handle 46. For example, with the arrangement illustrated in Fig. 2, two holes are lost in one revolution. This position is indicated by pointer 77 to figure 80 on the scale 75. The arc 103 passes through the fourth hole on the second turn of the spiral showing that the proportion of loss is constant. The effect is the same, therefore, as with a standard plate having 124 holes instead of 126 holes, the number of holes per turn in the plate 28. When the arm 65 is operatively associated with the slot 74, instead of losing holes per turn, it is possible to gain holes per turn, it of course being assumed that the handle 46 will be turned clockwise relative to the disk 28 during the operation thereof. In Fig. 2, for instance, if the block 66 were located in the same relative position in the slot 74 that it now occupies in the slot 73, each revolution of the crank handle 46 would intercept 128 holes instead of 124.

In issued Patent No. 2,357,329 the fractional allowance was effected after the plunger pin reached the marker 104 in its course along the spiral and allowance was made for the resulting angular displacement of the pin by providing for an extra stopped movement of sector arm at that time. Return of the plunger pin was invariably made to the first hole of the spiral by turning the index disk so that this hole coincided with the plunger pin at rest.

In order that the sector arms 52 and 53 might be made conventional, it is now allowed that the plunger pin can overrun the marked position 104 automatically to supply the remaining holes necessary to complete the movement. In this way a fractional movement of the sector arms is avoided. The means for doing this is one of the main features of this invention.

Figure 1:
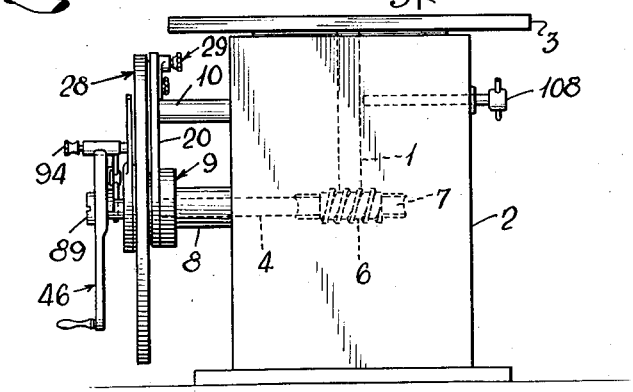

When the preceding has taken place the standard headlock 108, Fig. 1, is set as before to make sure the shaft 4 will not turn and the pin housing 47 is returned to its rest or support 86. The pin 97 is dropped in the half way hole 96. In this position the pin 48 will just clear the plate 28.

In order that one of the inside holes of the spiral (not the first one necessarily) might register with the plunger pin at rest, the index plate is now turned as before but with this difference— a sector ring 112 with two stop screws 113 and 116 stopping against abutment 114 is provided to turn the index plate through exactly the correct angle. It is turnably mounted on the index plate. Shoulders 115 hold it in place.

With the stop 113 against the abutment 114, Fig. 2, secure the ring 112 to the index plate 28 with the screw 117. The pin 134 is then withdrawn and the index plate with the sector ring turned clockwise until the stop screw 116 strikes the abutment 114 on the end of the arm 20. Replace pin 134 and release screw 117. The correct place for pin 113 in the circle of numbered and tapped holes 118 is taken from the chart. The number for each hole is engraved on the periphery of the ring 112. The angle or degree of turn of the index plate is exactly the same as with the former arrangement. The present offers the advantage of a positive stop. Later when a specific example is taken up it will be shown how this number for the chart is converted or taken directly from the same proportion as used in Patent No. 2,357,329.

It should also be noted that the gain or loss of any given number of holes is not confined to complete or unit turns of the handle 46. Requirements might make it necessary to lose two holes in one and one-half turns of the handle. The radius of the arm 65 then would have to be longer as indicated on the scale 75. If it had been one and two-thirds turns, the radius would have to be still longer. The choice of fractional turns may be any possible, with the use of the number of holes in the division circle 38 as the denominator of the fraction.

The operator does not have to concern himself about the aforesaid timing of differential movement to effect the fractional allowance at the even hole. It is taken care of for him by a chart to which the setting of a marker or synchronizing point 104 is made. How information for chart is obtained by the use of simple arithmetic will hereafter be explained.

It should be emphasized that the marker 104 serves only to indicate the point on the spiral where the secondary differential movement of the plunger pin 48 along arc 103 synchronizes exactly to the even hole with the main forward movement of the centerline 3—3 of crank. It is on or after this point that the fracture is made to return index pin to the coinciding hole on first turn of the spiral. The only reason why it is done this way is that it would not be practical to have all forty turns of the spiral on the index disk. Therefore, five spirals must be used over and over again. Simple proportion is used to figure this point of coincidence marked by 104.

Specific examples will now be given showing the use of a disk having a spiral row of holes 45 with 126 holes per turn. First we will describe an example where the result comes out even and then one where there is a very small error. These factors are mathematically so small that they can easily be ignored. It might be stated that the majority of problems have no correction factor.

However, to return to the example where the result comes out even: Let it be required to divide the circle into "553" parts. Our base number will be 5040, that is, 126 times 40 equals 5040, taking into account the ratio of 40 to 1 of the shaft 4 to the shaft 1. If the base number is 5040 and it is divided by the number "553," the quotient will be 9 with a remainder of "63." In terms of holes, it will then be necessary to lose "63" holes in the 40 turns of the handle 46. We will elect to lose "6" holes per group in this case. That makes 10½ groups. Furthermore, if the number of holes to be lost, "63," is subtracted from our base number "5040," our new corrected base number will be "4977" which is exactly divisible nine times by the number to be divided, "553."

Formula.

$$\frac{\text{Corrected base number} \times \text{holes of differential per group}}{\text{Number of holes to be lost or gained}} = \text{Number of holes of spiral to marker 104}$$

Formula applied:

$$\frac{4977 \times 6}{63} = 474 \text{ holes to the marker}$$

Marker is placed in hole following, or 475th so that index pin can be entered into the 474th. There are 126 holes per turn so the position of marker 104 is in the $$\left(\frac{475}{126} = 3\frac{97}{126}\right) \text{ 97th hole of the fourth turn}$$

This point is readily found because the holes are numbered to 126—every sixth hole (numbers not shown). The sector arms are set $$\frac{4977}{553} = 9 \text{ holes apart}$$

apart.

Beginning at first hole, division proceeds the same as when using a circle. The sector arms are moved forward each time to space off nine holes per division. Fifty-two divisions bring plunger pin into 468th hole. The marker now lies only six holes forward so it must be over-run three holes to complete the 53rd division. Plunger pin is returned to rest 86 after headlock 108 is secured. Using sector ring 112 as previously described, with screw 113 in the 102nd hole, index disk 28 is turned clockwise and again secured with pin 134. The third hole of the first turn of spiral (instead of the first as formerly) will now be under plunger pin. This is because the marker was over-run three holes to complete 53rd division. Enter plunger pin into this hole in index disk. Set sector arms to measure off the 54th division and proceed as before.

In making up chart for sector ring (lose) the 102nd hole for screw 113 was figured as follows: The marker indicates the 96th hole of fourth turn. To 96 add the six holes differential equals 102. The plate must be turned 102 holes for coincidence—always clockwise to avoid confusion.

To figure the sector ring setting when the plunger pin is pivoted in the opposite or "Gain" slideway 74, the above figures for example would be subtracted instead of added, 96−6=90. The stop screw 113 will be placed in the 90th hole. The reason for the difference is that when losing holes the plunger pin was six holes behind the centerline of the crank at the marker, whereas on the other hand, if the holes were being gained, the plunger pin would be six holes ahead of starting position— the centerline of the crank.

The next case is an example of how close an uneven problem works out. Let it be required to divide the circle into 383 parts. There will be a remainder, a small fractional part of one hole. The original base number "5040" will again be divided by the new number "383" giving a quotient of 13 with a remainder of 61. The corrected denominator then will be 4979 which contains the new number to be divided "383" exactly thirteen times. The remainder "61" in terms of holes must, however, be lost. This time five holes will be lost to the group in which case divide the remainder "61" by five and the result will be 12⅕ groups. Now take the new base number "4979," multiply it by five and divide by "61" and the result will be 408%₆₁. The marker 104 will now be set at the 408+1=409th hole on the spiral, that is, three complete turns of 126 holes and 31 additional holes of the fourth turn. Proportion formula (lose) for checking accuracy: (Group marker number) is to (marker number) plus (differential correction factor per group) as (corrected base number) is to $x$. Our proportion will then be 408:408+5::4979:$x$, in which case $x$ will equal 5040%₄₀₈. Then, if from this new number 5040%₄₀₈ is subtracted 5040, the result will be %₄₀₈ and in the terms of holes will equal a total error of %₄₀₈ of a hole. The ratio is 40 to 1, so there are 5040 holes passed by the handle for every turn of the worm gear and the job, i. e., 126×40=5040. But the error is equal to %₄₀₈ of the distance between two of these holes. In other words, the error in terms of revolution of the job is reduced 40 to 1 in terms of revolutions of the handle. Stated another way, it would be clear that, if the error was one hole on the dial, then that error would be ⅟₅₀₄₀ of one revolution inasmuch as it takes 5040 holes to make a revolution of the job.

But the error is not one hole. It is a very small fractional part of one hole, namely, %₄₀₈ of one hole. Therefore, the error stated in terms of revolutions of the job, must be proportionately smaller. The correct fractional equivalent is found by multiplying the two fractions together, namely, %₄₀₈ multiplied by ⅟₅₀₄₀ equals ½₉₃,₇₆₀. Translated into terms of revolution of the job, the error is equal to ½₉₃,₇₆₀ of one revolution, slightly less than four seconds.

To reiterate: For setting the dividing head for number 383, the following information was obtained from the chart:
1. Spiral marker 3 turns 31 holes
2. Index sector arms 52 and 53=

$$\frac{4979}{383} = 13 \text{ holes}$$

3. Sector ring 110. Screw 113 in 30 plus 5=35th hole

Obtained as follows: Marker or coincidence point is 408=3 turns+30 holes. Add 30 holes and differential correction factor per group (5 holes per group of 408 holes in this case) and the answer is 35.

4. Differential scale setting: "61L." This means that indicator 77 must point to the 61st line of scale 75 of the "L" or "lose" slideway 73. It indicates as already explained that 61 holes are to be "L"ost to make division come out even.

In conclusion, one example on the gain side will appear from the following: Divide a circle into 169 parts. If the base number 5040 is divided by 169, it is 30 holes short of coming out even. 169×30=5070. Therefore, 30 holes must be "gained" by differential motion. Using a differential factor of three holes per group, there will be 10 groups.
1. Then using formula:

$$\frac{5070 \times 3}{30} = 507, \text{ that is, } 507 + 1 = 508$$

$$\frac{508}{126} = 4 \text{ turns} + 4 \text{ holes position of marker}$$

2. Sector arms are set $$\frac{5070}{169} = 30 \text{ holes apart}$$

3. No sector ring movement that is movement of the annulus 112, is required for any "gain" or "lose" number divisible by 10 or 8, in case of a 40 to 1 reduction head. 30 is divisible by 10, therefore pin 134 need never be withdrawn.

4. Differential scale setting: 30G Pointer 77 will point to 30th line of scale 76 of the "G" or "Gain" slideway 74. 30 holes to be gained to make division come out even. Slide block 69 is transferred to slideway 74. The housing 47 must always be firmly pushed into concavity 86 at the time of tightening the screw 67 to secure the radius.

Sequence of operation is as follows: Sixteen divisions of 30 holes each are laid off by sector arms along spiral which brings pin to 480th hole of spiral. The marker must be "over-run" three holes to complete 17th division.

Set the lock 108 and return pin 41 to rest 86. It will exactly register with the third hole of the spiral. Insert pin in hole, release lock 108 and bring up sector arms for 18th division. Proceed as before. Foregoing is almost exactly like dividing with a conventional divider.

It is conceivable that the disk 28 shown in Fig. 2 with the circular row of holes 38 on front and back face, Fig. 3, while concentric may each have a different number so that these circular rows of holes on the front and the rear face of the disk may be used as the ordinary dividing head plate having circular concentric rows of pin holes.

The marker 104 above referred to, as shown in Fig. 5, consists of a stem having a head 104, the stem being conformed to fit snugly in any one of the holes of the spiral rows 45. The marker must be inserted in the hole following the final hole of the group so that it will so indicate this final hole.

It is obvious that various changes and modifications may be made to the details of construction without departing from the general spirit of the invention as set forth in the appended claims.

I claim:

1. In a dividing head for a machine shop tool, the combination of a control shaft operatively associated with the main shaft of the machine shop tool, a dividing disk rotatably mounted on said control shaft, a handle fixed to said control shaft, a device locking said disk against movement with said control shaft, said disk having a spiral row of pin receiving openings, a slide support extending transversely of, and fixed to, said handle and having an arcuate slideway of a predetermined curvature to either side of said handle, an arm adjustably mounted in either of said slideways to assume a predetermined angle with said support, a pin holder secured to the end of said arm, and a pin operatively mounted in said holder to enter any one of said openings.

2. In a dividing head for a machine shop tool, the combination of a control shaft operatively associated with the main shaft of the machine shop tool, a dividing disk rotatably mounted on said control shaft, a handle fixed to said control shaft, a device locking said disk against movement with said control shaft, said disk having a spiral row of pin receiving openings, a slide support extending transversely of, and fixed to, said handle and having an arcuate slideway of a predetermined curvature to either side of said handle, an arm adjustably mounted in either of said slideways to assume a predetermined angle with said support, a pin holder secured to the end of said arm, a pin slidably mounted in said holder, and a spring for urging said pin upward into one of said openings when in registration with said pin.

3. In a dividing head for a machine shop tool, the combination of a control shaft operatively associated with the main shaft of the machine shop tool, a reversible dividing disk rotatably mounted on said control shaft, a handle fixed to said control shaft, a device locking said disk against movement with said control shaft, said disk having a spiral row of pin receiving openings on each face thereof differing from one another in generation and number per turn, a slide support extending transversely of, and fixed to, said handle and having an arcuate slideway of a predetermined curvature to either side of said handle, an arm adjustably mounted in either of said slideways to assume a predetermined angle with said support, a pin holder secured to the end of said arm, a pin slidably mounted in said holder, a spring for urging said pin upward into one of said openings when in registration therewith, and means for anchoring said pin against the tension of said spring to maintain it clear of said disk.

4. In a dividing head for a machine shop tool, the combination of a control shaft operatively associated with the main shaft of the machine shop tool, a dividing disk rotatably mounted on said control shaft, a handle fixed to said control shaft, a device locking said disk against movement with said control shaft, said disk having a spiral row of pin receiving openings, a slide support extending transversely of, and fixed to, said handle and having an arcuate slideway of a predetermined curvature to either side of said handle, an arm adjustably mounted in either of said slideways to assume a predetermined angle with said support, a pin holder secured to the end of said arm, a pin operatively mounted in said holder to enter any one of said openings and a device for anchoring said disk against movement with said control shaft.

5. In a dividing head for a machine shop tool, the combination of a control shaft operatively associated with the main shaft of the machine shop tool, a dividing disk rotatably mounted on said control shaft, a handle fixed to said control shaft, a device locking said disk against movement with said control shaft, said disk having a spiral row of pin receiving openings, a pin holder operatively associated with said handle, a pin operatively mounted in said holder to enter any one of the openings and in said spiral row of pin receiving openings, an annulus rotatably mounted on the periphery of said disk and having a circular row of openings in radial alinement with the spirally arranged openings, and adjustable stop means on said annulus, disk and device to determine the operative position of said disk relative to said device.

JAMES R. HANSEN.

REFERENCES CITED

The following references are of record in the file of this patent:

UNITED STATES PATENTS

| Number | Name | Date |
|---|---|---|
| 1,225,106 | Brinkman | May 8, 1917 |
| 2,345,312 | Sorenson | Mar. 28, 1944 |
| 2,351,246 | Walling | June 13, 1944 |
| 2,357,329 | Hansen | Sept. 5, 1944 |